United States Patent
Kondou et al.

(10) Patent No.: US 8,654,508 B2
(45) Date of Patent: Feb. 18, 2014

(54) ELECTROCHEMICAL CAPACITOR AND ELECTRODE USED THEREIN

(75) Inventors: Keiichi Kondou, Hyogo (JP); Toshiro Kume, Hyogo (JP); Tomohiro Okuzawa, Osaka (JP)

(73) Assignee: Panasonic Corporation, Osaka (JP)

( * ) Notice: Subject to any disclaimer, the term of this patent is extended or adjusted under 35 U.S.C. 154(b) by 118 days.

(21) Appl. No.: 13/504,092

(22) PCT Filed: Nov. 11, 2010

(86) PCT No.: PCT/JP2010/006624
§ 371 (c)(1),
(2), (4) Date: Apr. 25, 2012

(87) PCT Pub. No.: WO2011/058748
PCT Pub. Date: May 19, 2011

(65) Prior Publication Data
US 2012/0218683 A1    Aug. 30, 2012

(30) Foreign Application Priority Data
Nov. 13, 2009    (JP) ................................. 2009-259629

(51) Int. Cl.
*H01G 9/00*    (2006.01)
(52) U.S. Cl.
USPC .......................................... 361/502; 361/508
(58) Field of Classification Search
None
See application file for complete search history.

(56) References Cited

U.S. PATENT DOCUMENTS

| | | | | |
|---|---|---|---|---|
| 2009/0311606 A1* | 12/2009 | Fukuoka et al. | .......... | 429/231.95 |
| 2010/0002362 A1* | 1/2010 | Clelland et al. | ................ | 361/502 |
| 2010/0033899 A1* | 2/2010 | Koh et al. | ...................... | 361/502 |

FOREIGN PATENT DOCUMENTS

| JP | 2006-303118 | 11/2006 |
|---|---|---|
| JP | 2007-067105 | 3/2007 |
| JP | 2009-141098 | 6/2009 |
| JP | 2009-188395 | 8/2009 |

OTHER PUBLICATIONS

International Search Report issued in International Patent Application No. PCT/JP2010/006624, mailed Feb. 15, 2011.

* cited by examiner

*Primary Examiner* — Jayprakash N Gandhi
*Assistant Examiner* — Dion Ferguson
(74) *Attorney, Agent, or Firm* — McDermott Will & Emery LLP (57) ABSTRACT

Disclosed is an electrochemical capacitor which comprises an element, an electrolyte, and an outer case that houses the element and the electrolyte. The element comprises: a negative electrode that is obtained by forming a negative electrode layer on the surface of a collector, the negative electrode layer containing a carbon material in which lithium ions are absorbed; a positive electrode that is obtained by forming a positive electrode layer on the surface of a collector, the positive electrode layer absorbing ions; and a separator that is interposed between the negative electrode and the positive electrode. The electrolyte contains lithium ions. A coating film that contains lithium carbonate is formed on the surface of the carbon material that is contained in the negative electrode layer.

5 Claims, 4 Drawing Sheets

Prior Art

FIG. 4B

Prior Art

ELECTROCHEMICAL CAPACITOR AND ELECTRODE USED THEREIN

RELATED APPLICATIONS

This application is the U.S. National Phase under 35 U.S.C. §371 of International Application No. PCT/JP2010/006624, filed on Nov. 11, 2010, which in turn claims the benefit of Japanese Application No. 2009-259629, filed on Nov. 13, 2009, the disclosures of which Applications are incorporated by reference herein.

TECHNICAL FIELD

The present invention relates to an electrochemical capacitor for use in all kinds of electronic equipments including devices, such as a backup power supply, an electric power regenerator, and an electric power storage device, for hybrid vehicles and fuel-cell electric vehicles. In particular, the invention relates to electrodes used in the electrochemical capacitor.

BACKGROUND ART

Electrochemical capacitors have received much attention which achieve a higher capacitance and withstand voltage relative to electric double-layer capacitors. Among others, in order to enhance the withstand voltage of the electrochemical capacitors, a technology has been developed to increase the withstand voltage of the capacitors by pre-absorbing (pre-doping) lithium ions in carbon materials of the negative electrodes of the capacitors, reducing electric potentials of the negative electrodes.

Figure 4A:
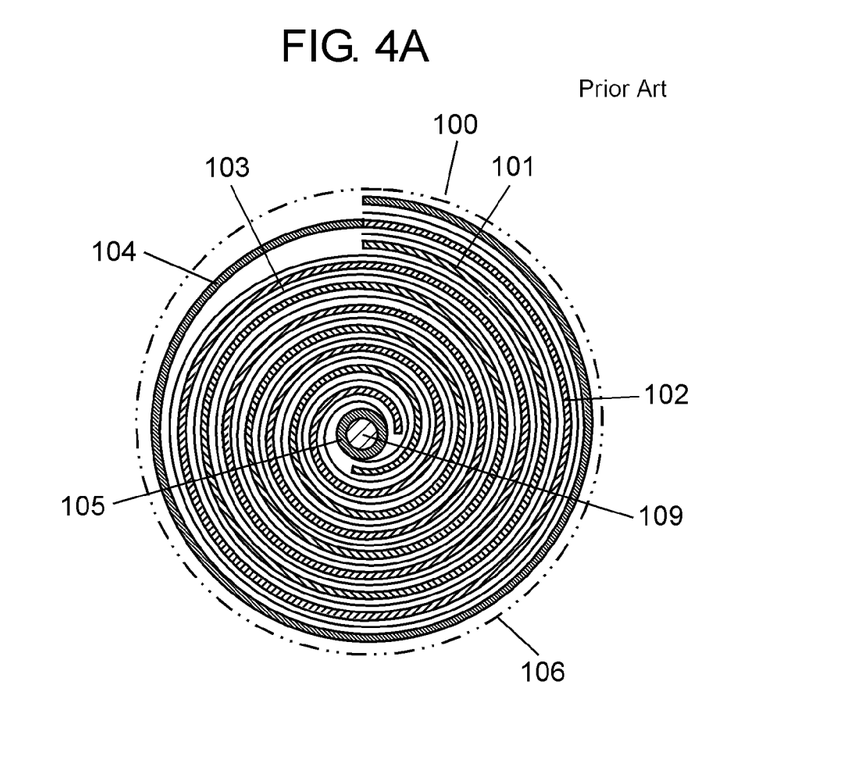
FIG. 4A is a cross-sectional top view of a conventional electrochemical capacitor.
Figure 4B:
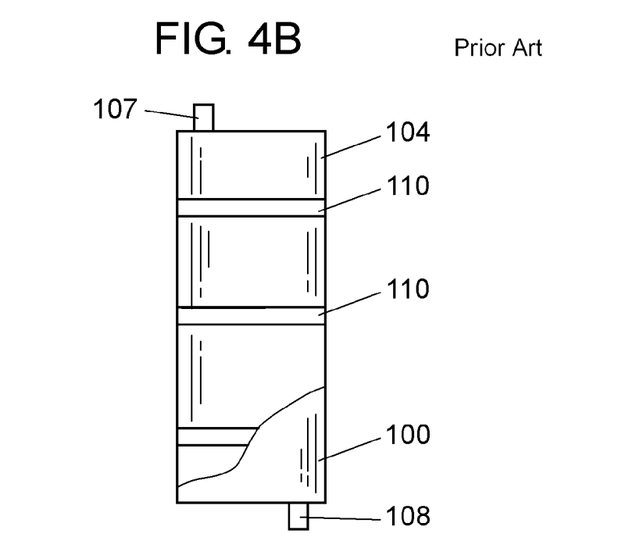
FIG. 4B is a partially cut-away front-elevation view of an element used in the conventional electrochemical capacitor.

FIG. 4A is a cross-sectional top view of a conventional electrochemical capacitor that employs lithium ions as cations. FIG. 4B is a partially cut-away front-elevation view of electrode-wound unit 100 of the electrochemical capacitor.

In FIG. 4A, the electrochemical capacitor includes: positive electrode 101, negative electrode 102, separator 103, lithium metals (lithium electrodes) 104 and 105, pipe rod 109, and outer case 106. Electrode-wound unit 100 is formed such that separator 103 is laminated between positive electrode 101 and negative electrode 102 to form a laminated body, and then the body is concentrically wound. Lithium metals 104 and 105 are disposed, as lithium ion supply sources, at an outer periphery and a central portion of electrode-wound unit 100, respectively. Electrode-wound unit 100 and lithium metal 104 and 105 are housed in outer case 106, and outer case 106 is filled with an electrolyte (not shown). Outer case 106 is formed of aluminum, iron, or the like. Lithium metal 105 formed at the central portion of the winding is supported by pipe rod 109 that also serves as an axial rod for supporting electrode-wound unit 100.

Positive electrode 101 and negative electrode 102 each include: a collector composed of a porous material provided with through-holes penetrating through both sides thereof; and an electrode layer formed on the collector. The collector is formed of a metal such as copper or aluminum, for example. With the collector being a porous material, even if lithium metals 104 and 105 are respectively disposed at such locations, i.e. the outer periphery and the central portion of electrode-wound unit 100, lithium ions from lithium metals 104 and 105 can freely move between the electrodes through the through-holes of electrode-wound unit 100. Accordingly, lithium ions can be doped in advance (pre-doped) in the whole of negative electrode 102 of electrode-wound unit 100.

In FIG. 4B, electrode terminal 107 and electrode terminal 108 are coupled with the collector of positive electrode 101 and the collector of negative electrode 102, respectively. Electrode terminal 107 and electrode terminal 108 are each desorbed in the direction of the winding axis of cylindrical electrode-wound unit 100, with both the terminals being in parallel and in opposite directions to each other. Electrode-wound unit 100 is secured using tape 110 at the outermost periphery thereof so as to be held in a wound-shape.

In this way, by disposing lithium metals serving as lithium-ion supply sources at the two locations, i.e. the outer periphery and the central portion of electrode-wound unit 100, the conventional electrochemical capacitor can achieve more rapid doping of lithium ions into negative electrode 102 than that by disposing only a lithium-ion supply source at one location for supplying lithium ions for doping. Note that, for example, Patent Literature 1 is known as information on conventional techniques related to this application.

However, in cases where lithium ions are pre-doped into the electrochemical capacitor by such the method described above, an increase in internal resistance of the electrochemical capacitor after the pre-doping has been a problem.

That is, generally, in performing pre-doping, a part of the electrolyte is decomposed to form an SEI (Solid Electrolyte Interphase) coating on the surfaces of the carbon materials such that the coating suppresses excessive decomposition of a solvent in the electrolyte and surfaces of the carbon materials composing the electrode layers of the negative electrode. The problem described above is in that, in the process of forming the SEI coating, the thickness of the SEI coating is increased and the SEI coating is formed containing compounds with a low electric conductivity. This hinders lithium ions from traveling to and from the inside of the negative electrode during charging and discharging, resulting in the increased resistance of the negative electrode, which in turn causes an increase in the internal resistance of the electrochemical capacitor.

CITATION LIST

Patent Literature

Patent Literature 1: Japanese Patent Unexamined Publication No. 2007-067105

SUMMARY OF THE INVENTION

The present invention relates to an electrochemical capacitor whose negative electrode has a low resistance after pre-doping.

The electrochemical capacitor according to the invention includes an element, an electrolyte, and an outer case that houses them. The element includes: a negative electrode in which a negative electrode layer is formed on the surface of a collector, with the electrode layer including a carbon material that absorbs lithium ions; a positive electrode in which a positive electrode layer adsorbing ions is formed on the surface of a collector; and a separator interposed between the negative electrode and the positive electrode. The electrolyte contains lithium ions. On the surface of the carbon material included in the negative electrode layer, a coating is formed which contains lithium carbonate.

Use of the negative electrode layer described above allows reduced resistance of the negative electrode and increased capacitance of the electrochemical capacitor.

DESCRIPTION OF EMBODIMENTS

Figure 1:
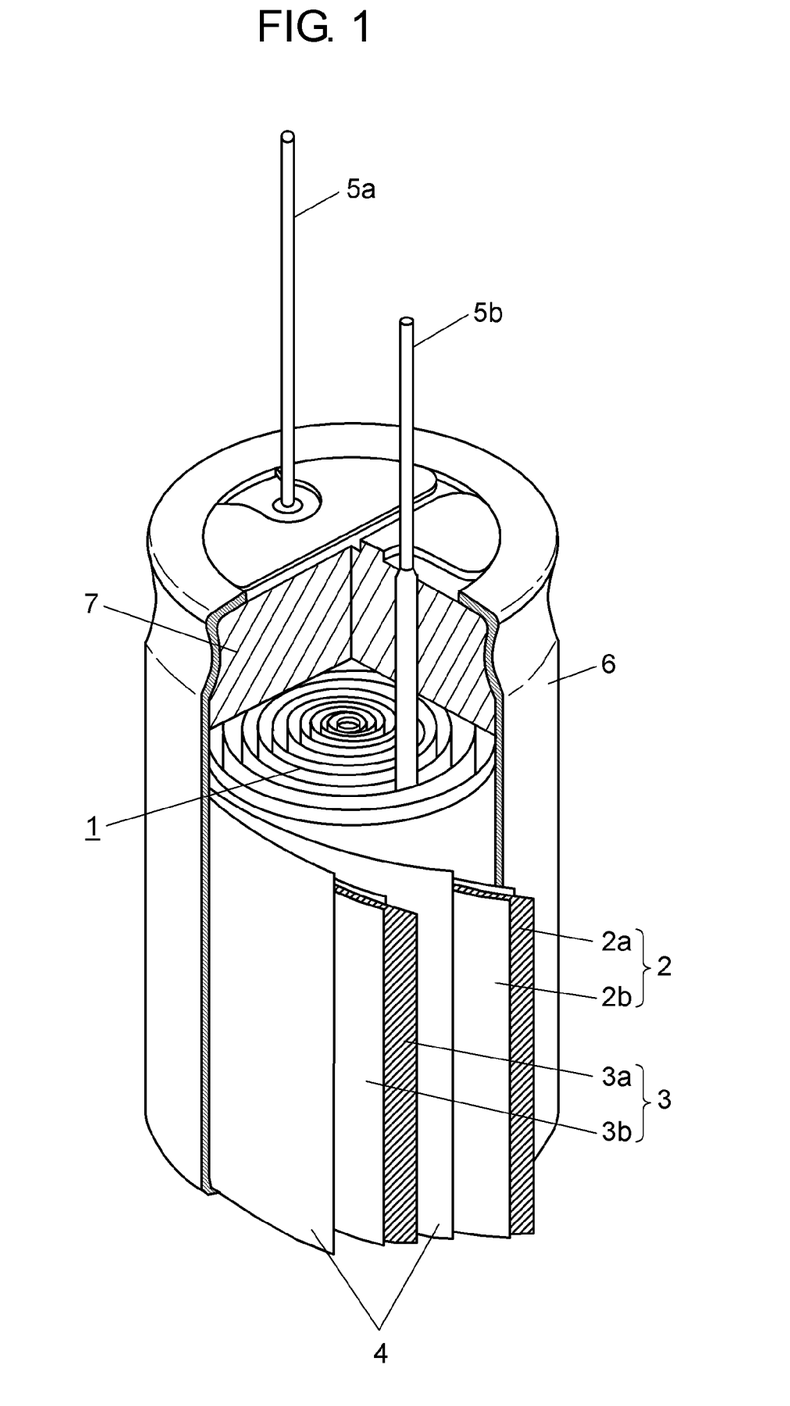
FIG. 1 is a partially cut-away perspective view of an electrochemical capacitor according to an embodiment of the present invention.

FIG. 1 is a partially cut-away perspective view of an electrochemical capacitor according to an embodiment of the present invention. The electrochemical capacitor according to the embodiment includes: element 1, outer case 6 serving as a case, sealing member 7, and an electrolyte (not shown). Element 1 is formed by winding a laminated body composed of negative electrode 3, separator 4, and positive electrode 2. Incidentally, the element may be a stacked one, instead of the wound one, which is formed by stacking a negative electrode, a separator, and a positive electrode.

Positive electrode 2 includes collector 2a and polarizable electrode layer 2b serving as a positive electrode layer. Polarizable electrode layer 2b is capable of adsorbing and desorbing ions such as lithium ions on the surface thereof. A material used for polarizable electrode layer 2b serving as the positive electrode layer is preferably, for example, activated carbon or the like. Separator 4 is interposed between negative electrode 3 and positive electrode 2. Element 1 and the electrolyte are housed in outer case 6. Collectors 2a and 3a are formed of a metal such as aluminum.

Negative electrode 3 includes collector 3a and carbon electrode layer 3b serving as a negative electrode layer. Carbon electrode layer 3b contains a carbon material that absorbs lithium ions by the surface thereof. On the surface of the carbon material contained in carbon electrode layer 3b, a coating is formed containing lithium carbonate.

Moreover, the carbon material for use in carbon electrode layer 3b is preferably graphite carbon which has characteristics of a high withstand voltage and a small energy loss in a charge-discharge cycle. However, other materials are also applicable, i.e. such as easily-graphitizable carbon, low-temperature fired carbon, and hardly-graphitizable carbon. Since each of these materials exhibits different specific performance from each other when comparing them in terms of material-properties, they are appropriately selected depending on purpose of use. For example, the easily-graphitizable carbon has superior performance in terms of low resistance and long lifetime for charge-discharge cycles. The low-temperature fired carbon has superior performance in terms of high capacitance and low resistance. The hardly-graphitizable carbon has superior performance in terms of high capacitance and small cycle loss.

Lead wire 5a and lead wire 5b are coupled respectively with the surface of positive electrode 2 and the surface of negative electrode 3, as electrode extraction terminals. The open end portion of outer case 6 is sealed with sealing member 7, with lead wires 5a and 5b being exposed to the outside. It is preferable that lead wires 5a and 5b be the same kinds of metals as those for collectors 2a and 3a, respectively. Therefore, lead wire 5a is formed of aluminum, and lead wire 5b is formed of copper. The lead wires may be formed using other metals, such as iron, stainless steel, nickel, than the above, and using various alloys composed of at least two of these aforementioned five metals. However, the embodiment is not limited to the above metals, and any materials having electric conductivity may be used. Moreover, the electrode extraction terminals is not limited to be of the line shape of the lead wires or the like; therefore, other shapes, e.g. shapes of a plate material and a block material, may be employed for the terminals. Furthermore, other configurations may be employed in which one electrode is electrically coupled with metallic outer case 6, while the other is extracted by an extraction terminal.

The electrolyte is, for example, preferably one in which electrolyte cations are lithium ions, and electrolyte anions are anions containing fluorine atoms in consideration of withstand voltage characteristics. In particular, the anions are more preferably $BF_4^-$ or $PF_6^-$. Moreover, for a solvent used in the electrolyte, there are applicable a cyclic carbonate, mixture of chain carbonates, cyclic ester, chain ester, cyclic ether, and chain ether. In addition, organic solvents are also applicable which include a group such as an epoxy group, sulfone group, vinyl group, carbonyl group, amide group, or cyano group. For example, propylene carbonate, ethylene carbonate, gamma-butyrolactone, sulfolane, ethyl methyl carbonate, dimethyl carbonate, diethyl carbonate, and butylene carbonate are applicable. Moreover, the solvent is not limited to one kind of solvent, and two or more kinds of solvents may be appropriately selected and mixed for use. It is noted that the electrolyte is not limited to the configuration described above and has only to be required to contain lithium ions.

Outer case 6 uses a metal such as aluminum, copper, or nickel, for example, in view of heat dissipation characteristics. However, the material of the case is not limited to specific ones as long as the material unlikely reacts with the electrolyte. In addition, a prismatic-column-shaped case and a laminate-shaped case may be used for the outer case.

Figure 2A:
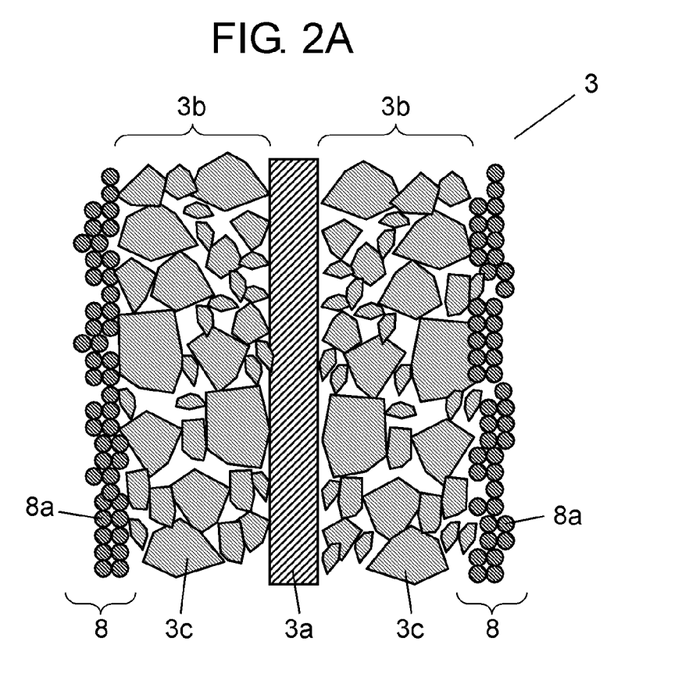
FIG. 2A is a cross-sectional front-elevation view of a negative electrode used in the electrochemical capacitor according to the embodiment of the invention, in a state immediately after a lithium film has been formed on the surface of the negative electrode.
Figure 2B:
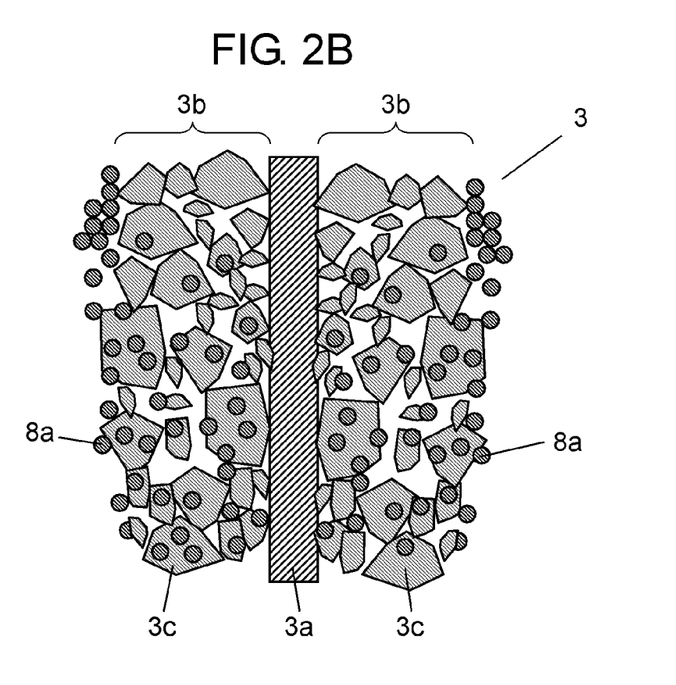
FIG. 2B is a cross-sectional front-elevation view of the negative electrode used in the electrochemical capacitor according to the embodiment of the invention, in a state after metallic lithium of the electrode has diffused thereinto.

Here, a description is made regarding pre-doping carried out for negative electrode 3 that configures element 1, with reference to FIGS. 2A and 2B. FIG. 2A is a cross-sectional front-elevation view of the negative electrode used in the electrochemical capacitor according to the embodiment, in a state immediately after a lithium film has been formed on the surface of the negative electrode. FIG. 2B is a cross-sectional front-elevation view of the negative electrode used in the electrochemical capacitor according to the embodiment, in a state after metallic lithium of the negative electrode has diffused. The pre-doping is a process in which negative electrode 3 absorbs lithium ions in advance.

First, lithium film 8 to be a lithium ion supply source is formed on the rear and front surfaces of carbon electrode layer 3b of negative electrode 3. In the embodiment, for example, a vacuum deposition apparatus for a physical gas-phase method may be used in the method of forming lithium film 8 on both surfaces of negative electrode 3. Specifically, a predetermined process control is performed for the apparatus at a high degree of vacuum such that lithium film 8 containing metallic lithium 8a is formed on the surfaces of negative electrode 3. Then, after having formed lithium film 8, the high degree of vacuum in the apparatus is reduced to increase the pressure up to approximately atmospheric pressure (purging). The purging is carried out in such a way that a gas containing an inert gas and a gaseous carbon dioxide, or the gaseous carbon dioxide alone is introduced into the apparatus.

Negative electrode 3 having lithium film 8 thus-formed on the surfaces thereof is impregnated with the electrolyte containing lithium ions as cations, which results in the ionization of lithium of lithium film 8. Then, the lithium ions are introduced between the layers of a multilayer crystal structure of carbon material 3c, and absorb carbon material 3c of negative electrode 3. This leads to a reduction in the electric potential of negative electrode 3. Thus, a certain amount of lithium of lithium film 8 formed on negative electrode 3 absorbs carbon material 3c by impregnating negative electrode 3 with the electrolyte for a certain period of time. This completes the pre-doping.

The occlusion referred to here is a phenomenon that lithium ions in the proximity of negative electrode 3 move into between the layers of the multilayer crystal structure of carbon material 3c to form an intercalation compound of carbon atoms and lithium atoms.

Then, as described above, upon absorbing the lithium ions into negative electrode 3, the electrode potential of negative electrode 3 decreases due to an electrochemical reaction of the lithium ions. This results in a large difference in the electric potential between positive electrode 2 and negative electrode 3, used in the electrochemical capacitor, which thereby increases the energy density of the electrochemical capacitor.

Incidentally, such pre-doping carried out for negative electrode 3 is a common process in the field of lithium-ion secondary batteries as well. However, an objective of the pre-doping in the field of lithium-ion secondary batteries is to reduce the irreversible capacity of the negative electrode of a lithium-ion secondary cell in charge-discharge cycles, thereby increasing the charging and discharging capacity thereof.

In contrast, an objective of the pre-doping for the electrochemical capacitor is to reduce the potential of negative electrode 3, thereby allowing an increased voltage of the capacitor. The difference in the objectives between these pre-doping processes causes a difference between them in an amount of absorbed lithium ions upon pre-doping. Specifically, the amount of absorbed lithium ions for the lithium-ion secondary battery is obviously smaller than that for the electrochemical capacitor because, in the lithium-ion secondary battery, the amount of absorbed lithium ions is needed only for the amount corresponding to the irreversible capacity of negative electrode 3.

In the embodiment, by vacuum deposition, i.e. a gas-phase method, lithium film 8 serving as a lithium source is formed on carbon electrode layer 3b. Accordingly, as shown in FIG. 2B, metallic lithium 8a forming lithium film 8 is allowed to diffuse into the inside of carbon electrode layer 3b to come close to the proximity of carbon material 3c. This allows a reduction in the distance through which metallic lithium 8a moves as a lithium ion after the impregnation with the electrolyte. If a different method for doping is employed, such as doping by attaching lithium foil on the carbon electrode layer or doping by using lithium ions contained in the electrolyte, lithium fluoride with a low electric conductivity is adversely formed by the reaction shown in Chemical Reaction Formula 1 for a period during which metallic lithium or lithium ions diffuse in the electrolyte to reach the inside of the carbon electrode layer. In the embodiment described above, however, it is possible to carry out the pre-doping within a short period of time, with the formation of lithium fluoride being suppressed. Suppressing the formation of lithium fluoride allows a lower resistance of negative electrode 3. Note that the diffusion referred to here lies mostly in the phenomenon that lithium diffuses into the inside of the carbon electrode layer.

$$3Li^+ + 2e^- + PF_6^- \rightarrow 3LiF + PF_3 \quad \text{(Chemical Reaction Formula 1)}$$

Moreover, when forming lithium film 8 on carbon electrode layer 3b by vacuum deposition, it is possible to appropriately perform process control so as to prevent metallic lithium moved close to the proximity of carbon material 3c from causing intercalation in carbon material 3c before the impregnation with the electrolyte. This is because the diffusion of metallic lithium 8a into the inside of carbon electrode 3b is suppressed due to heating by such as radiation heat from the deposition apparatus. The metallic lithium 8a composes lithium film 8 formed by vapor deposition. This allows the suppression of the formation of the thick SEI coating containing lithium fluoride with a high resistance on the surface of carbon material 3c.

Moreover, by introducing gaseous carbon dioxide during the purging, it is also possible to suppress the formation of a coating of lithium fluoride on the surface of carbon material 3c when impregnating negative electrode 3 with the electrolyte. This is because a part of lithium film 8 deposited on carbon electrode layer 3b becomes lithium carbonate with a low reactivity, due to the gaseous carbon dioxide introduced during the purging.

Moreover, when impregnating negative electrode 3 with the electrolyte, plenty of lithium carbonate is present in the proximity of the surface of carbon material 3c, with the carbonate being formed from metallic lithium 8a that comes to the proximity of the surface of carbon material 3c via the diffusion described above. Therefore, in the proximity of the surface of carbon material 3c, the concentration of lithium ions increases, while the concentration of anions decreases relatively. This reduces the chance of contact and reaction between anions and carbon material 3c the electric potential of which is being decreased, which enhances the effect of suppressing decomposition reaction of anions in the proximity of the surface of negative electrode 3. Hence, the formation of lithium fluoride is suppressed.

In addition, in comparison with the method of pre-doping by attaching to negative electrode 3 lithium foil (not shown in the figures) commercially available in sheet form, the method such as vacuum deposition is advantageous to form the lithium film because the thickness thereof can be made so small to the extent that the commercial lithium foil is difficult to hold the foil-shape itself. This allows a reduction in the volume of lithium film 8 formed as a lithium supply source.

Reducing the thickness of lithium film 8, in turn, allows a reduction of the volume of voids that appear in the inside of element 1 after pre-doping. Accordingly, the energy density of the electrochemical capacitor can be increased.

Incidentally, with the current technological level, the smallest possible thickness of lithium foil formed by rolling is approximately 20 μm. In contrast, the thickness of lithium film 8 formed by vapor deposition in the embodiment can be made smaller, even if it is 10 μm or less.

If lithium film 8 is formed solely by vapor deposition without purging using inert gases and carbon dioxide, resulting lithium film 8 is then mainly composed of metallic lithium 8*a*. Thus-deposited metallic lithium 8*a* diffuses into the inside of carbon electrode layer 3*b* before impregnation with the electrolyte and is introduced as-is into the bulk of carbon material 3*c*, sometimes leading to the formation of intercalation compounds of metallic lithium 8*a* with carbon material 3*c*. This causes a drop in the electric potential of negative electrode 3 before the impregnation of negative electrode 3 with the electrolyte. In the case where the potential drop is large, when impregnating the resulting potential-dropped negative electrode 3 with the electrolyte, the solvent in the electrolyte in the proximity of negative electrode 3 is rapidly decomposed to form compounds such as lithium fluoride. The resulting compounds adversely form a thick SEI coating on the surface of carbon material 3*c*. Incidentally, for the electrochemical capacitor, the electrode potential drops to approximately 0.05 V to 0.2 V, while the decomposition starting potential of the solvent is approximately 1.0 V to 1.5 V.

Therefore, although the diffusion of metallic lithium 8*a* of lithium film 8 into the inside of carbon electrode layer 3*b* is necessary, excessive diffusion must be suppressed by control.

In the pre-doping process described above, although the use only of gaseous carbon dioxide is sufficient for the purging, other gases mixed with an inert gas may be used in an environmental point of view. In this case, the ratio of the inert gas to gaseous carbon oxide is not limited to a specific one.

Moreover, the inert gas used is particularly preferably argon in view of cost, and other inert gases including helium, neon, and krypton are preferably used.

In addition, the amount of functional groups is preferably reduced in the surface of carbon material 3*c*. The reason for this is as follows. Carbon material 3*c* has a larger amount of functional groups in the surface thereof than that of silicon compounds used as a negative electrode material in the field of secondary batteries and the like. The functional groups in the surface react with the metallic lithium composing lithium film 8 to form lithium compounds, i.e. lithium hydroxide and lithium oxide, which have no contribution to the pre-doping. This is because, in the course of forming lithium film 8 by vapor deposition, metallic lithium 8*a* formed via vaporization is so chemically active that the metallic lithium is easy to react with the functional groups in the surface described above.

Note that, in the embodiment, the pre-doping is not limited to be carried out at a specific stage as long as it is carried out after the formation of negative electrode 3. For example, the pre-doping may be carried out after forming element 1. Moreover, in the embodiment, although lithium film 8 is formed by vacuum deposition, i.e. a gas-phase method, the method of the formation is not limited to the one described above. Other methods, such as ink-jetting and lithium-fusion-coating, may be employed for forming the lithium film on the negative electrode as long as a good permeability of lithium into carbon electrode layer 3*b* is achieved.

Moreover, the electrolyte is also not limited to the configuration described above. A mixture is also applicable of two or more of the kinds of anions shown in the following chemical formulas. That is, a mixture is preferably of two or more kinds of the anions including: $PF_6^-$, $BF_4^-$, $P(CF_3)_xF_{6-x}^-$ (X=1 to 6), and $B(CF_3)_yF_{4-y}^-$ (Y=1 to 4) ($CF_3$ may be replaced with chain or cyclic fluorocarbon such as $C_2F_5$). The reason is considered as follows.

As for capacitance and resistance of the electrochemical capacitor, the capacitance and resistance of positive electrode 2 are particularly important. The active substance of positive electrode 2 is activated carbon as described above in the embodiment. The diameter of pores contained in the activated carbon described above is not uniform, but exhibits a certain pore size distribution. The radii of the anions and the diameters of pores of the activated carbon each exhibit an optimal region. Therefore, in considering the activated carbon's pores having a plurality of the diameters, it is possible to utilize a larger amount of capacitance of the activated carbon of positive electrode 2 when using the anions having a plurality of the diameters, for adsorption and desorption, than that when using the anions having a single diameter. That is, use of a mixture of two or more kinds of anions allows a higher utilization of the capacitance of the pores of the activated carbon.

Moreover, the capacitance of the activated carbon appears when the activated carbon adsorbs lithium ions, with the voltage of the positive electrode being 3.0 V (with respect to $Li/Li^+$ potential) or less. At this moment, the lithium ions undergo solvation and the state of the solvation varies depending on the kinds of anions.

That is, modifying the solvated radii of lithium ions allows a largest-possible increase in the capacitance of the activated carbon of the positive electrode with a voltage of 3.0 V (with respect to $Li/Li^+$ potential) or less.

This phenomenon is one unique to the electrochemical capacitor according to the present invention in which the carbon material is used as a negative electrode so as to be pre-doped with lithium ions and the activated carbon is used as a positive electrode so as to form the polarizable electrode.

Needless to say, the higher the anion's voltage resistance (withstand voltage) becomes, the more desirable the electrolyte anions are. That is, in view of the withstand voltage of an anion per se, $PF_6^-$ is preferable because of its relatively high withstand voltage. Therefore, the combination of anions described above is more preferable when it includes $PF_6^-$.

The reason why the configuration described above increases the withstand voltage is conjectured as follows. From a viewpoint of suppression of corrosion of aluminum serving as a collector, it is necessary to form, in advance, a coating mainly composed of aluminum fluoride on the surface of the aluminum, i.e. the collector. In this case, since $PF_6^-$ is capable of effectively supplying F– to the surface of the aluminum, the electrochemical capacitor with the electrolyte containing $PF_6^-$ is expected to have a high withstand voltage. For this reason, the aluminum fluoride coating can be efficiently formed in such a way that, a coating of aluminum fluoride is once formed electrochemically by using $PF_6^-$, and then other anions including $BF_4^-$ are added and mixed.

Moreover, a further increase in withstand voltage is possible in such a way that aluminum fluoride is formed in advance on the surface of the collector by an electrode-plate treatment in a dry atmosphere, such as a plasma treatment or a gas treatment. In addition, a further more increase in the substantial withstand voltage is possible when the activated carbon is also treated simultaneously, leading to an increase in capacitance and a reduction in resistance. Furthermore, the electrode-plate treatment in a dry atmosphere allows a simple handling of the electrolyte such that two or more kinds of anions can be handled just like a single one, which brings about an advantage of large productivity improvements.

First Exemplary Embodiment

Hereinafter, a description of the electrochemical capacitor according to the embodiment is made, by referring to exemplary embodiments. It should be noted that the methods for manufacturing the electrochemical capacitor according to the embodiment, described hereinafter, are nothing more than an example of realizing the configuration according to the present invention; therefore, the present invention is not limited to the manufacturing methods described hereinafter.

First, a step of forming positive electrode 2 is described. For collector 2a, high-purity aluminum foil (containing 99% or more of Al) with a thickness of approximately 15 μm is used, for example. The aluminum foil is electrolytically-etched in a chlorine-based etchant to have the surface thereof roughened.

Then, polarizable electrode layer 2b is formed on the both sides of surface-roughened collector 2a. The material composing polarizable electrode layer 2b includes activated carbon, a binder, and a conductivity aid.

The activated carbon is, for example, phenolic-resin-based activated carbon with an average grain size of 5 μm. The binder is, for example, a solution of carboxymethyl cellulose (CMC) in water. The conductivity aid is acetylene black, for example. The activated carbon, the binder, and the conductivity aid are mixed for use, in ratio by weight 10:2:1, respectively. The resulting mixture is mixed and kneaded with a kneading machine, and adjusted to have a predetermined viscosity, thereby a paste.

The resulting paste is applied to the both sides of collector 2a, and dried at 100° C. in the ambient atmosphere. In this way, polarizable electrode layer 2b with a thickness of 40 μm is formed. Then, thus-prepared collector 2a, on which polarizable electrode layer 2b had been formed, undergoes slitting operation with a predetermined slit width.

Furthermore, a part of polarizable electrode layer 2b formed on the both sides of collector 2a is removed. Then, lead wire 5a is coupled with the collector at the portion from which the part of polarizable electrode layer 2b has been removed, by a needle-caulking method, or the like. This completes positive electrode 2.

Next, a step of forming negative electrode 3 is described. For collector 3a, copper foil with a thickness of approximately 15 μm is used, for example.

Then, carbon electrode layer 3b is formed on the both sides of collector 3a. For the material composing carbon electrode layer 3b, a carbon material is used which is capable of reversibly absorbing and desorbing lithium ions. The carbon material is graphite carbon, for example. For the conductivity aid, acetylene black is used, for example, as well as positive electrode 2. For the binder, a mixture of polytetrafluoroethylene (PTFE) and CMC in ratio by weight 4:1 is used, for example. These materials, i.e. the carbon material, the conductivity aid, and the binder, are mixed in ratio by weight 8:1:1 to prepare a paste.

When preparing the paste, CMC, acetylene black, graphite carbon, and PTFE are added in this order to water, and then stirred and kneaded.

The thus-prepared paste is applied to the both sides of collector 3a with a Comma Coater, a die coater, or the like such that the applied paste on each side has a thickness of approximately 50 μm. Then, the paste is dried at 80° C. in the ambient atmosphere. After drying, collector 3a with carbon electrode layer 3b formed on the both sides thereof undergoes press-forming at a linear pressure of 75 to 100 kgf/cm, with the pressure being adjusted such that carbon electrode layer 3b on each side has a thickness of 40 μm and a density of 0.4 to 1.0 g/cm$^3$. Then, after press working, the collector 3a with carbon electrode layer 3b formed on the both sides thereof undergoes slitting operation with a predetermined slit width.

Moreover, as well as positive electrode 2, a part of carbon electrode layer 3b formed on the surface of collector 3a is removed. Then, lead wire 5b composed of such as copper is coupled with the collector at the portion from which the part of carbon electrode layer 3b has been removed, by resistance welding or the like. This completes negative electrode 3.

Next, as shown in FIG. 2A, lithium film 8 to be a lithium ion source on negative electrode 3 is formed on the both sides of carbon electrode layer 3b by a physical gas-phase method. In the exemplary embodiment, a vacuum deposition apparatus is used in the method by which lithium film 8 is formed on the both sides of negative electrode 3.

Deposition of lithium with the vacuum deposition apparatus is preferably carried out through process control under such conditions as follows: The pressure inside the chamber is preferably $10^{-2}$ to $10^{-5}$ Pa, the temperature of the lithium evaporation source is preferably 400 to 600° C., and the temperature of the electrode (the carbon material) is preferably −20 to 80° C. Moreover, when purging the chamber after the deposition, the partial pressure of supplied gaseous carbon dioxide is preferably set to 0.02 to 0.5 atmospheric pressure. Furthermore, the holding temperature of the electrode during purging is preferably set to room temperature to 300° C., more preferably to room temperature to 100° C. However, these conditions described above vary depending on the shape and size of negative electrode 3 and various kinds of requirements; therefore, conditions other than the ones described above may be appropriately selectively employed.

Next, a step of forming element 1 is described. Above-described positive electrode 2 and negative electrode 3 are placed to face each other and then laminated, with separator 4 being interposed therebetween. Separator 4 is composed of cellulosic paper with a thickness of approximately 35 μm and a density of 0.45 g/cm$^3$, for example. The thus-laminated unit is wound to form element 1. This completes element 1.

Next, a step of housing element 1 and the electrolyte in outer case 6 is described. Element 1 is housed in the outer case, and then the electrolyte is charged into the casing. The electrolyte is LiPF$_6$ with a concentration of 1.0 mol/l, for example. The solvent is a mixed solvent of ethylene carbonate (EC) with a high dielectric constant and dimethyl carbonate (DMC) with a low viscosity, in ratio by weight 1:1, for example. However, the electrolyte according to the present invention is not limited to the configuration described above; therefore, other configurations may be employed to achieve the same effect as described above as long as the electrolyte contains lithium ions.

Next, a step of pre-doping negative electrode 3 with lithium ions is described. As described above, the step of housing the electrolyte and element 1 into the outer case causes negative electrode 3 in element 1 to be impregnated with the electrolyte. By leaving the outer case as it is for a predetermined period of time, a certain amount of lithium ions are absorbed by carbon material 3c of negative electrode 3. In this way, this completes the step of pre-doping negative electrode 3 with lithium ions.

Next, a step of sealing is described. Sealing member 7 is disposed at the opening of bottomed cylindrical outer case 6. Then, the outer case 6 undergoes radially-inward drawing operation where sealing member 7 is located, from the outer peripheral surface of the opening of outer case 6 toward the inside of outer case 6. Moreover, the end of the opening of outer case 6 undergoes curling operation. In this way, sealing member 7 is crimped and secured to outer case 6. Note that, in this case, lead wires 5a and 5b protruding from element 1 are in the state that the lead wires are desorbed to the outside of outer case 6 via through-holes provided in sealing member 7. This completes the sealing of the opening of outer case 6.

Finally, the thus-assembled electrochemical capacitor undergoes a quality preservation step, i.e., the capacitor is subjected to initial-operation verification testing after having undergone aging treatment. This completes the electrochemical capacitor.

Figure 3A:
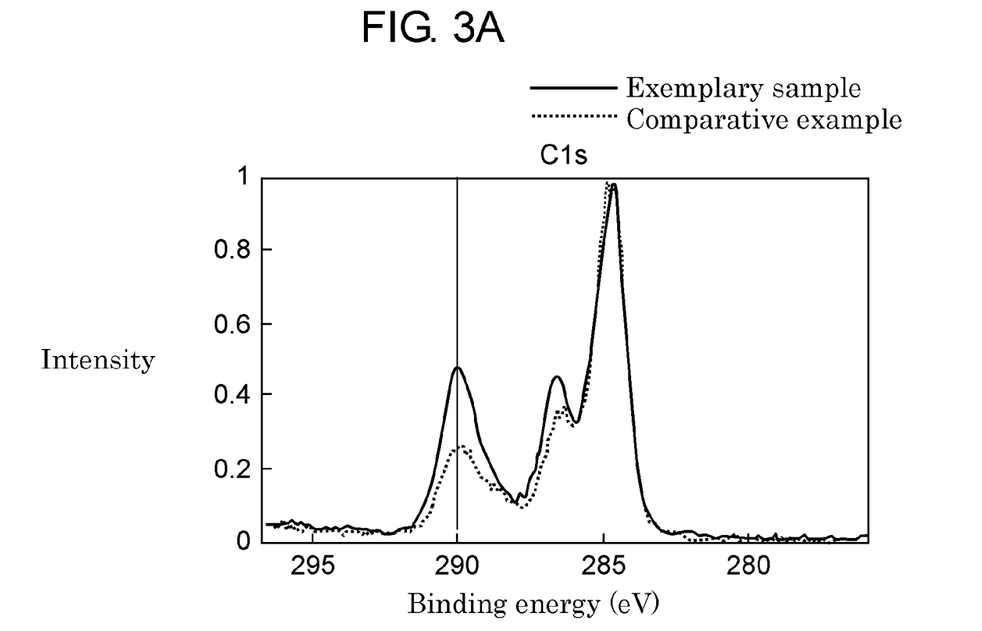
FIG. 3A is a spectrum diagram including: a spectrum showing a state of carbonate bond in a surface portion of a carbon electrode layer of the negative electrode used in the electrochemical capacitor according to the embodiment of the invention; and a spectrum showing a state of carbonate bond in a surface portion of a carbon electrode layer of a negative electrode of a comparative example.
Figure 3B:
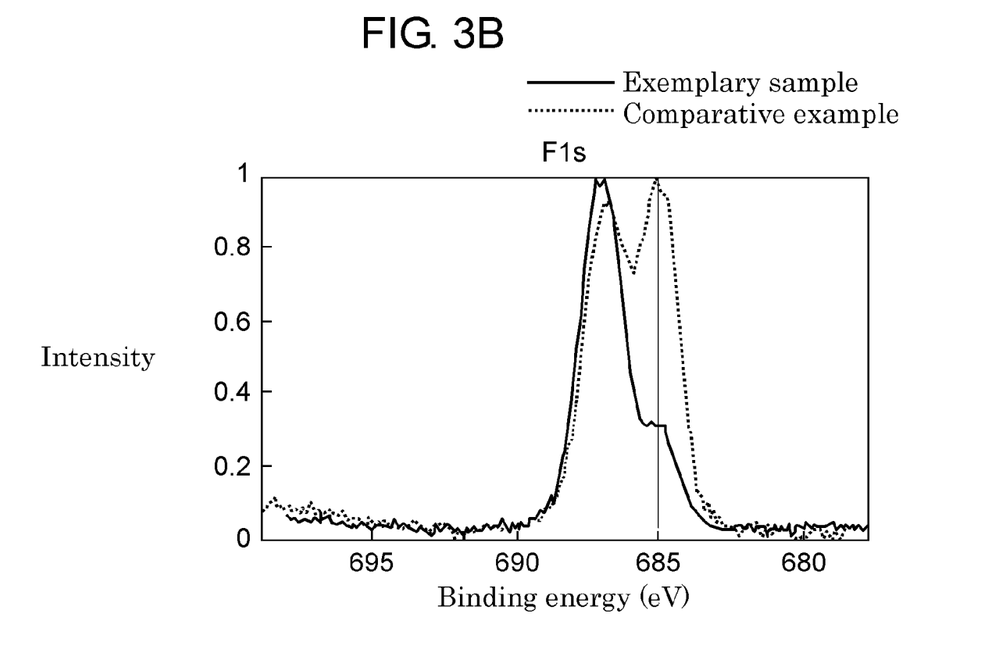
FIG. 3B is a spectrum diagram including: a spectrum showing a state of atomic bond between lithium and fluorine in the surface portion of the carbon electrode layer of the negative electrode used in the electrochemical capacitor according to the embodiment of the invention; and a spectrum showing a state of atomic bond between lithium and fluorine in the surface portion of the carbon electrode layer of the negative electrode of the comparative example.

Next, a description is made regarding the state of the negative electrode of the electrochemical capacitor manufactured according to the exemplary embodiment, with reference to FIGS. 3A and 3B.

FIG. 3A is spectra of C1s intensity, including: a spectrum showing a state of carbonate bond in a surface portion of carbon electrode layer 3b of negative electrode 3 used in the electrochemical capacitor according to the exemplary embodiment; and a spectrum showing a state of carbonate bond in a surface portion of a carbon electrode layer of a comparative example to be described below. FIG. 3B is spectra of F1s intensity which show a state of atomic bond between lithium and fluorine in the surface portion of the carbon electrode layer of each of the exemplary embodiment and the comparative example.

The comparative example shown in FIGS. 3A and 3B is different only in pre-doping from the exemplary embodiment described above. Specifically, the comparative example underwent pre-doping in such a way that negative electrode 3 was impregnated with an electrolyte containing lithium ions, and a voltage was applied between the positive and negative electrodes, thereby pre-doping lithium ions into negative electrode 3. This pre-doping is different from that in the exemplary embodiment in which negative electrode 3 was impregnated with the electrolyte after having formed lithium film 8 thereon in advance by the gas-phase method.

Each of the exemplary embodiment and the comparative example was subjected to X-ray photoelectron spectroscopy (XPS) by narrow scanning.

In FIG. 3A, at a binding energy of approximately 290 eV that shows the state of carbonate bond, the peak intensity of the exemplary embodiment is twice as strong as that of the comparative example. Moreover, in FIG. 3B, it can be seen that, at a binding energy of approximately 685 eV that shows the state of atomic bond between lithium and fluorine, the peak intensity of the exemplary embodiment is one-third as strong as that of the comparative example.

These results show that, compared with the negative electrode of the comparative example, negative electrode 3 of the exemplary embodiment is such that the amount of lithium fluoride with a low conductivity contained in the SEI coating is reduced, and that the amount of compounds such as lithium carbonate in the coating is increased, with the compounds having carbonate bonds.

In the embodiment as described above, when forming metallic lithium 8a on negative electrode 3 for use in pre-doping, metallic lithium or lithium carbonate are deposited on the surface of carbon material 3c, with metallic lithium 8a being controlled so as not to be absorbed as-is into the bulk of carbon material 3c. Accordingly, the pre-doping is carried out, with a high density of lithium being present on the surface of carbon material 3c, which results in suppression of the formation of lithium fluoride onto the surface of carbon material 3c. As a result, the SEI coating is formed that contains a smaller amount of lithium fluoride with a low conductivity than that of lithium carbonate with a high conductivity.

In the embodiment, it can be said that the low resistance is achieved of the SEI coating formed on the negative electrode for use in the electrochemical capacitor, by follows. That is, focusing on the presence of lithium fluoride with a low conductivity contained in the SEI coating, the content ratio of lithium fluoride is reduced, while the content of lithium carbonate is increased which exhibits a good chemical stability and a high conductivity associated with lithium ions.

Performance Evaluation Test

Hereinafter, a description is made regarding a performance evaluation test using the electrochemical capacitors according to the exemplary embodiment.

In this test, there were compared the electrochemical capacitors of the exemplary samples and the comparative examples prepared based on conditions 1 to 3, to evaluate influences on internal resistance of each of the electrochemical capacitors.

Table 1 shows the results.

TABLE 1

| | | | Material parameter | | | | Characteristics | |
| | | | 0.1-10 | 5-5000 | SEI coating evaluation | | evaluation | |
| | | | Carbon | Lithium | 0.01-0.8 | 0.25-0.9 | ≤1 | ≥700 |
| | | | average | crystal | XPS intensity ratio | | | |
| | | Pre-doping by | grain size [μm] | grain size [nm] | A (Li—F/P—F) | B (C=O/C—C) | DC-IR [mΩ] | Capacitance [F] |
| Cond. 1 | Sample 1 | Gas-phase | 5.1 | 38 | 0.0108 (≈0.01) | 0.247 (≈0.25) | 0.5 | 780 |
| | Sample 2 | Gas-phase | 5.1 | 38 | 0.6 | 0.51 | 0.6 | 770 |
| | Sample 3 | Gas-phase | 5.1 | 38 | 0.8 | 0.9 | 0.7 | 760 |
| | Comparative example 1 | Gas-phase | 5.1 | 38 | 0.85 | 0.77 | 2.0 | 690 |
| | Comparative example 2 | Gas-phase | 5.1 | 38 | 0.73 | 0.92 | 3.9 | 580 |
| | Comparative example 3 (Conventional example) | Electrolyte | 5.1 | 39 | 1.05 | 0.2 | 1.1 | 750 |
| Cond. 2 | Sample 4 | Gas-phase | 0.12 (≈0.1) | 38 | 0.33 | 0.44 | 0.4 | 785 |
| | Sample 5 | Gas-phase | 5.1 | 38 | 0.3 | 0.48 | 0.5 | 780 |

TABLE 1-continued

| | | | Material parameter | | SEI coating evaluation | | Characteristics evaluation | |
|---|---|---|---|---|---|---|---|---|
| | | | 0.1-10 | 5-5000 | 0.01-0.8 | 0.25-0.9 | ≤1 | ≥700 |
| | | | Carbon | Lithium | XPS intensity ratio | | | |
| | | | average | crystal | | | | |
| | | Pre-doping by | grain size [μm] | grain size [nm] | A (Li—F/P—F) | B (C=O/C—C) | DC-IR [mΩ] | Capacitance [F] |
| | Sample 6 | Gas-phase | 9.2 | 38 | 0.29 | 0.5 | 0.7 | 772 |
| | Comparative example 4 | Gas-phase | 0.08 | 38 | 0.32 | 0.61 | 2.8 | 660 |
| | Comparative example 5 | Gas-phase | 12 | 38 | 0.3 | 0.51 | 2.6 | 670 |
| Cond. 3 | Sample 7 | Gas-phase | 5.1 | 5.3 (≈5) | 0.33 | 0.55 | 0.6 | 751 |
| | Sample 8 | Gas-phase | 5.1 | 38 | 0.3 | 0.48 | 0.5 | 785 |
| | Sample 9 | Gas-phase | 5.1 | 4969 (≈5000) | 0.37 | 0.49 | 0.8 | 710 |
| | Comparative example 6 | Gas-phase | 5.1 | 4 | 0.32 | 0.52 | 4.1 | 570 |
| | Comparative example 7 | Gas-phase | 5.1 | 5130 | 0.34 | 0.37 | 3.1 | 610 |

First, in condition 1 (Cond. 1) of Table 1, intensity A and intensity B were each prepared as follows: The carbon electrode layers used in the samples and the comparative examples were measured by XPS. In the resulting F1s spectrum of the respective carbon electrode layers, intensity (A1) showing the atomic bond between lithium and fluorine and intensity (A2) showing the atomic bond between phosphorus and fluorine, were determined to calculate intensity ratio A(=A1/A2). In the resulting C1s is spectrum of the respective carbon electrode layers, intensity (B1) showing the atomic bond between carbon and oxygen and intensity (B2) showing the atomic bond between carbon and carbon, were determined to calculate intensity ratio B(=B1/B2). The preparation procedure for the ratios will be described later.

Next, in condition 2 (Cond. 2), the grain sizes of the carbon material contained in the respective carbon electrode layers were prepared. In condition 3 (Cond. 3), the crystallite sizes of the metallic lithium were prepared, which was formed as a lithium film by deposition on the respective negative electrodes.

Note that, in Table 1, for pre-doping procedure, only comparative example 3, i.e. a conventional example, employed the method in which lithium ions contained in the electrolyte were absorbed in the negative electrode, while the other samples and comparative examples employed the method in which a lithium films was formed by deposition, i.e. a gas-phase method, on the surface of the respective negative electrodes. All of the configurations except for the above are the same as for all the samples and comparative examples, as an electrochemical capacitor.

Firstly, in condition 1, using the resistance value of comparative example 3, i.e. a conventional example, as a demarcation line, samples 1 to 3 and comparative example 1 to 3 show as follows: Referring to intensity ratio A(Li—F/P—F) and intensity ratio B(C=O/C—C) obtained by XPS, the measured resistance values are low when intensity A is in the range not smaller than 0.01 and not lager than 0.8 and intensity B is in the range not smaller than 0.25 and not larger than 0.9. This shows that the electrochemical capacitors excellent in output characteristics, i.e. the electrochemical capacitors according to the invention, can be obtained by satisfying both aforementioned conditions of intensities A and B, leading to a reduction in DC-IR of the negative electrode thereof.

The reason of this is in that the SEI coating needs to be formed not only simply by causing the coating to contain lithium ions with a high conductivity as much as possible, but also by reducing the amount of lithium fluoride with a low conductivity.

Accordingly, in fact, intensity ratio A(Li—F/P—F) showing the content of lithium fluoride is preferably equal to zero. However, it is difficult to substantially eliminate the presence of lithium fluoride at the near surface of the carbon material. Hence, the lower limit of intensity A is preferably set equal to 0.01, for example, in view of the fact that the content of lithium fluoride is preferably reduced as low as possible.

In this way, in order to manufacture electrochemical capacitors provided with negative electrodes having such high-quality SEI coatings as one in the invention, aforementioned intensities A and B in XPS are necessary to be respectively adjusted to within the numeric value ranges described in the invention, as a requirement for the high-quality SEI coating.

This lies in the fact as follows: During deposition, a countless number of metallic lithium vapors are blown and adhere onto the surface of the negative electrode to liquefy and solidify, with heat being released. The released heat is taken by the negative electrode. So, the appropriately-cooled electrode can cool the deposited metallic lithium, and prevent the lithium from diffusing by thermal energy to be absorbed as-is in the bulk of the carbon material, which allows a temporary retention of the lithium. This retention helps cause the metallic lithium to travel into the inside of the carbon electrode layer and to adhere on the surface of the particulate carbon material.

For example, when forming the lithium film on the carbon material by vacuum deposition, i.e. a gas-phase method, in a manner for samples 1 to 3 of the exemplary embodiment, the conditions are set as follows: The pressure inside the chamber is preferably $10^{-2}$ to $10^{-5}$ Pa, the temperature of the lithium evaporation source is preferably 400 to 600° C., and the temperature of the electrode (the carbon material) is preferably −20 to 80° C. Moreover, when purging the chamber after the deposition, the partial pressure of supplied carbon dioxide is preferably set to 0.02 to 0.5 atmospheric pressure. Furthermore, the holding temperature of the electrode during purging is preferably set to room temperature to 300° C., more preferably to room temperature to 100° C.

Secondary, in condition 2, samples 4 to 6 and comparative examples 4 and 5 show that the grain size of the carbon material used for the carbon electrode layer is preferably 0.1 to 10 μm. It is considered that, when the grain size of the carbon material is smaller than 0.1 µm, the surface area of the carbon material increases to increase the reactivity of the individual grains of the carbon material, which leads to an excessively-thick SEI coating, resulting in the increased resistance. In contrast, it is considered that, when the grain size of the carbon material is larger than 10 µm, the distance through which the lithium ions travel becomes large, which results in a prolonged time period required for the carbon material to absorb and desorb the lithium ions, resulting in the increased resistance.

Finally, in condition 3, samples 7 to 9 and comparative examples 6 and 7 show that the crystallite size of the metallic lithium formed as a lithium film is preferably 5 to 5000 nm.

This is because, in the case where the crystallite size of the metallic lithium is smaller than 5 nm, when forming the lithium film on the negative electrode by vapor deposition, the metallic lithium undergoes solid-phase diffusion and is concurrently absorbed as-is in the carbon material. This drops the electric potential of the negative electrode instantly, upon the impregnation with the electrolyte. Then, the rapid potential drop causes the electrolyte to be decomposed significantly, resulting in the formation of the excessively-thick SEI coating. In contrast, when the crystallite size of the metallic lithium is larger than 5000 nm, the size is so large that it becomes difficult for the metallic lithium to be absorbed by the carbon material.

Note that the preparation of the crystallite size of metallic lithium can be made, in deposition, by adjusting the amount of heat added to the evaporation source and by adjusting the conditions of the temperature inside the deposition apparatus.

Therefore, in order to achieve the outstanding advantages of the electrochemical capacitor according to the present invention, it is preferable that the largest possible amount of lithium carbonate is contained and the smallest possible amount of lithium fluoride is contained, in the SEI coating formed on the surface of carbon electrode layer 3b. That is, when carbon electrode layer 3b is measured by XPS, intensity ratio A1/A2 in the F1s spectrum is preferably $0.01 \leq (A1/A2) \leq 0.8$, where intensity A1 shows the bonding state between fluorine and lithium and intensity A2 shows the bonding state between fluorine and phosphorus, and intensity ratio B1/B2 in the C1s spectrum is preferably $0.25 \leq (B1/B2) \leq 0.9$, where intensity B1 shows the state between carbon and oxygen and intensity B2 shows the bonding state between carbon and carbon.

INDUSTRIAL APPLICABILITY

The electrochemical capacitor and the electrodes used therein exhibit excellent characteristics in charging and discharging. They are useful for applications including power supplies for power regeneration and backup of hybrid vehicles, for example.

The invention claimed is:

1. An electrochemical capacitor, comprising:
    an element including:
        a negative electrode having a collector and a negative electrode layer formed on a surface of the collector, the negative electrode layer including a carbon material occluding lithium ions;
        a positive electrode having a collector and a positive electrode layer formed on a surface of the collector, the positive electrode layer adsorbing ions; and
        a separator interposed between the negative electrode and the positive electrode;
    an electrolyte containing a lithium ion; and
    an outer case housing the element and the electrolyte,
    wherein a coating containing lithium carbonate is formed on a surface of the carbon material included in the negative electrode layer, and
    wherein, regarding an F1s spectrum and a C1s spectrum measured by X-ray photoelectron spectroscopy (XPS), the negative electrode layer is represented by that an intensity ratio A1/A2 in the F1s spectrum is $0.01 \leq (A1/A2) \leq 0.8$, where A1 is an intensity showing a bonding state between fluorine and lithium and A2 is an intensity showing a bonding state between fluorine and phosphorus, and by that an intensity ratio B1/B2 in the C1s spectrum is $0.25 \leq (B1/B2) \leq 0.9$, where B1 is an intensity showing a bonding state between carbon and oxygen and B2 is an intensity showing a bonding state between carbon and carbon.

2. The electrochemical capacitor according to claim 1, wherein, the carbon material included in the negative electrode layer is granular, and an average grain size of the carbon material is not smaller than 0.1 µm and not larger than 10 µm.

3. An electrode, comprising:
    a collector; and
    an electrode layer formed on a surface of the collector, the electrode layer including:
        a carbon material capable of occluding lithium; and
        metallic lithium,
    wherein a coating containing lithium carbonate is formed on a surface of the carbon material and on a surface of the metallic lithium, and
    wherein, regarding an F1s spectrum and a C1s spectrum measured by X-ray photoelectron spectroscopy (XPS), the negative electrode layer is represented by that an intensity ratio A1/A2 in the F1s spectrum is $0.01 \leq (A1/A2) \leq 0.8$, where A1 is an intensity showing a bonding state between fluorine and lithium and A2 is an intensity showing a bonding state between fluorine and phosphorus, and by that an intensity ratio B1/B2 in the C1s spectrum is $0.25 \leq (B1/B2) \leq 0.9$, where B1 is an intensity showing a bonding state between carbon and oxygen and B2 is an intensity showing a bonding state between carbon and carbon.

4. The electrode according to claim 3, wherein a crystal grain size of the metallic lithium included in the electrode layer is not smaller than 5 nm and not larger than 5000 nm.

5. The electrode according to claim 3, wherein the carbon material included in the electrode layer is granular, and an average grain size of the carbon material is not smaller than 0.1 µm and not larger than 10 µm.

* * * * *